United States Patent [19]

Bartholomew

[11] Patent Number: 4,944,536
[45] Date of Patent: Jul. 31, 1990

[54] BLEED-DOWN CONNECTOR ASSEMBLY

[75] Inventor: Donald D. Bartholomew, Marine City, Mich.

[73] Assignee: Proprietary Technology, Inc., Southfield, Mich.

[21] Appl. No.: 327,797

[22] Filed: Mar. 23, 1989

Related U.S. Application Data

[63] Continuation-in-part of Ser. No. 776,644, Sep. 16, 1985, Pat. No. 4,681,351, which is a continuation-in-part of Ser. No. 360,201, Mar. 22, 1982, Pat. No. 4,601,497, which is a continuation-in-part of Ser. No. 201,711, Oct. 29, 1980, Pat. No. 4,423,892.

[51] Int. Cl.⁵ .............................................. F16L 37/00
[52] U.S. Cl. ..................................... 285/319; 285/924
[58] Field of Search ................................ 285/924, 319

[56] References Cited

U.S. PATENT DOCUMENTS 3,540,760  11/1970  Miller et al. ................... 285/924 X
3,645,567   2/1972  Reinker, Jr. ................... 285/924 X
4,750,765   6/1988  Cassidy et al. ................. 285/924 X
4,842,309   6/1989  LaVene et al. ................. 285/924 X

FOREIGN PATENT DOCUMENTS

85/02450  6/1985  PCT Int'l Appl. .

Primary Examiner—Dave W. Arola
Assistant Examiner—Carol I. Bordas
Attorney, Agent, or Firm—Harness, Dickey & Pierce

[57]  ABSTRACT

A blood-down conector assembly is described which employs a rotatatable cap for controlling the axial movement of the conducit in the connector housing between the sealed and bleed-down positions. The cap is mounted concentrically over the housing for both rotational and axial movement with respect to the connector housing. The cap includes a wall portion which is formed to engage a retainer associated with the connector assembly for retaining or maintaining the conduit in the housing. The housing is formed to provide a ramp of varying axial length and the cap is formed with a plurality of depending spring-like tabs which engage the ramp and limit the axial movement of the cap with respect to the housing.

13 Claims, 3 Drawing Sheets

BLEED-DOWN CONNECTOR ASSEMBLY

CROSS REFERENCE TO RELATED APPLICATION

This application is a continuation-in-part of Ser. No. 776,644 filed on Sept. 16, 1985, now U.S. Pat. No. 4,681,351 which is a continuation-in-part of Ser. No. 360,201 filed on Mar. 22, 1982, now U.S. Pat. No. 4,601,497 which is a continuation-in-part of Ser. No. 201,711 filed on Oct. 29, 1980, now U.S. Pat. No. 4,423,892.

Background and Summary of the Invention

The present invention relates generally to connector assemblies, and particularly to a connector assembly which is capable of providing a bleed-down position for pressurized lines.

In the automotive industry, as well as for many other industries, the need always exists for low-cost, reliable, and easy to assemble components. This need is especially apparent with respect to providing a connection between fluid carrying conduits, such as fuel or refrigerant lines. In air conditioning systems and other pressurized systems that trap a compressive gas, it is desirable to provide a way of bleeding-down the confined pressure in the line prior to the actual disconnection of the pressurized line. One technique of achieving this goal is to provide a bleed-down position in the connector assembly for the pressurized line which will permit the desired decrease in pressure while maintaining the line or conduit in at least a partially connected position. An example of one such connector assembly is set forth in the inventor's prior U.S. Pat. No. 4,423,892, issued on Jan. 3, 1984. In this connector assembly, a retainer element is partially withdrawn from the connector assembly to permit a partial withdrawal of the conduit from the connector housing. Additional examples of bleed-down connector assemblies are shown in the Foults U.S. Pat. No. 3,453,005, issued on July 1, 1969; the Klein U.S. Pat. No. 3,574,359, issued on Apr. 13, 1971; the Vyse U.S. Pat. No. 3,584,902, issued on June 15, 1971; the Klein U.S. Pat. No. 3,718,350, issued on Feb. 27, 1973; and the DeVincent, et al. U.S. Pat. No. 3,929,357, issued on Dec. 30, 1985.

It is a principal objective of the present invention to provide an improved bleed-down connector assembly for conduits adapted to convey pressurized fluids.

It is another objective of the present invention to provide a bleed-down connector assembly which uses a rotational movement to permit a partial withdrawal of the conduit to the bleed-down position.

It is an additional objective of the present invention to provide a bleed-down connector assembly which does not require any tools to vent the pressure from the conduit.

It is a further objective of the present invention to provide a bleed-down connector assembly which permits a controlled withdrawal of the conduit from the fully inserted or sealed position to the bleed-down or unsealed position.

It is yet another objective of the present invention to provide a bleed-down connector assembly which does not require the removal of any of the connector components to bleed-down and disconnect the conduit.

It is yet another objective of the present invention to provide a bleed-down connector assembly which can be preassembled, and thus only require a snap-in connection to be made with the tubular conduit.

To achieve the foregoing objectives, the present invention provides a bleed-down connector assembly which employs a rotatable cap for controlling the axial movement of the conduit in the connector housing between the sealed and bleed-down positions. Specifically, the cap is mounted concentrically over the housing for both rotational and axial movement with respect to the connector housing. The cap includes a wall portion which is formed to engage a retainer associated with the connector assembly for retaining or maintaining the conduit in the housing. In one embodiment according to the present invention, the housing is formed to provide a ramp of varying axial length and the cap is forced with a plurality of depending spring-like tabs which engage the ramp and limit the axial movement of the cap with respect to the housing.

In another embodiment that is particularly useful for easily formed tubing of brass or aluminum, a thread may be rolled into the large diameter portion of the housing so that a threaded end cap may be screwed thereover. This connector assembly is particularly well suited for allowing the tube expansion and thread rolling processes to be employed for the female portions of the connector. The thin wall stamped metal cap with rolled on threads is inexpensive and well established for other uses.

Additional objectives and advantages of the present invention will become apparent from a reading of the detailed description of the preferred embodiments which make reference to the following set of drawings:

Detailed Description of the Preferred Embodiments

Figure 1:
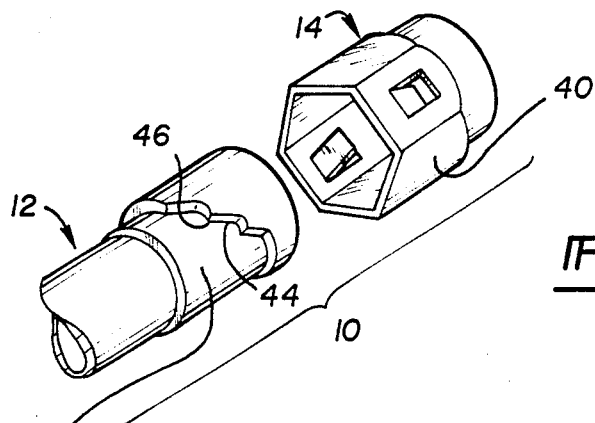
FIG. 1 is a perspective assembly view of a bleed-down connector assembly according to the present invention.
Figure 2:
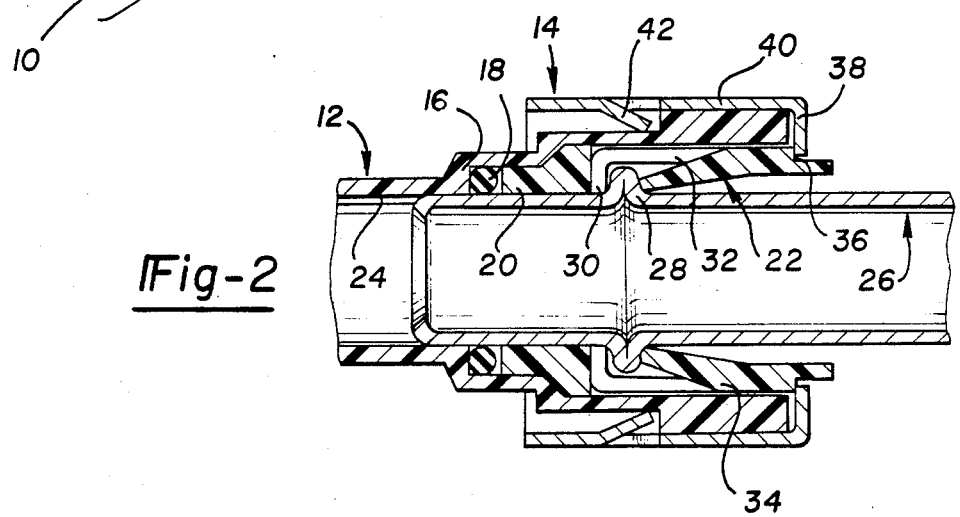
FIG. 2 is a cross sectional view of the connector assembly shown in FIG. 1 in which the conduit is in the fully inserted or sealed position.

Referring to FIG. 1, a perspective assembly view of a bleed-down connector assembly 10 according to the present invention is shown. The connector assembly 10 generally comprises a housing subassembly 12 and a cap member 14. As shown in FIG. 2, the cap member 14 is adapted to be concentrically disposed over one end of the housing subassembly 12. The housing subassembly 12 includes a housing body generally designated by the reference numeral 16, a seal element 18, a bushing element 20, and a retainer element 22. The seal element 18 comprises an elastomeric O-ring which is seated in the axial bore 24 of the housing body 16 between a vertically extending wall portion of the housing and the bushing element 20. While the seal element 18 is shown to be seated in body 16, the seal element could also be seated on the conduit 26 in the appropriate application. The bushing element 20 is generally annular in shape and is preferably press-fitted into the housing body 16. As will be appreciated from FIG. 2, the bushing element 20 limits the axial movement of the tubular conduit 26 in the direction of insertion of the conduit into the housing body 16. The axial position of the bushing 20 is in turn limited by an inclined wall portion of the housing body 16 which engages in enlarged diameter portion of the bushing element.

The retainer element 22 is formed to cooperate with an outwardly projecting annular surface 28 of the conduit 26 to fix the axial position of element 22 to the conduit such that the retainer element will move with the axial movement of the conduit 26. The retainer shown in FIG. 2 is intended to be exemplary only, and it should be appreciated that other suitable retainer elements may be provided in the appropriate application. For example, a number of suitable retainer elements shown in the inventor's prior U.S. Pat. Nos. 4,423,892 and 4,541,658, which are hereby incorporated by reference.

Figure 4:
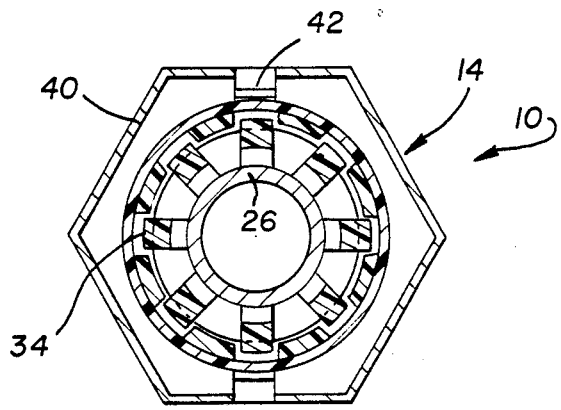
FIG. 4 is a cross sectional view of the connector assembly along lines 4—4 of FIG. 3.

The retainer element 22 includes a circular ring or collar portion 30, a pair or plurality of generally axially extending leg portions 32, and a pair or plurality of depending tab portions 34. As shown in FIG. 4, the tab portions 34 are circumferentially spaced about the diameter of the retainer element 22, and retainer element 22 is sized in relation to the conduit 26 so that the free end of the tab portions 34 engage and abut against the outwardly projecting annular surface 28 of the conduit. The retainer element 22 also includes a vertically extending wall portion 36 which is adapted to abut against a depending flange portion 38 of the cap member 14. While the wall portion 36 is shown to engage the retainer element 22, it should be appreciated that this wall portion could also be used in another suitable structure which performs the function of the retainer element. The specific shape and thickness of the wall portion 36 need only be such as to provide the necessary abutting strength to maintain the desired position on the conduit 26. Thus, for example, it may be desirable to provide the wall portion 36 in the shape of a lip which is curled back toward the retainer element 22.

As may be best seen in FIG. 1, the cap member 14 includes a generally hexagonal shaped, axially extending portion 40 which has a sufficiently large inner diameter to slip over the housing body 16. While the cap member is shown to have this hexagonal shape, it should be appreciated that other suitable shapes may be employed in the appropriate application. The cap member 14 includes a pair of circumferentially spaced, inwardly directed tabs 42 which are sufficiently spring-like to permit the cap 14 to slip over the housing body 16. Once the cap 14 is in the position shown in FIG. 2, the tabs 42 will deflect inwardly towards the housing body 16 to lock the cap member 14 onto the housing. While only one pair of diametrically opposed tabs 42 are shown, it should be appreciated that additional tabs could be provided, or in the appropriate application only one such tab may be required.

Figure 3:
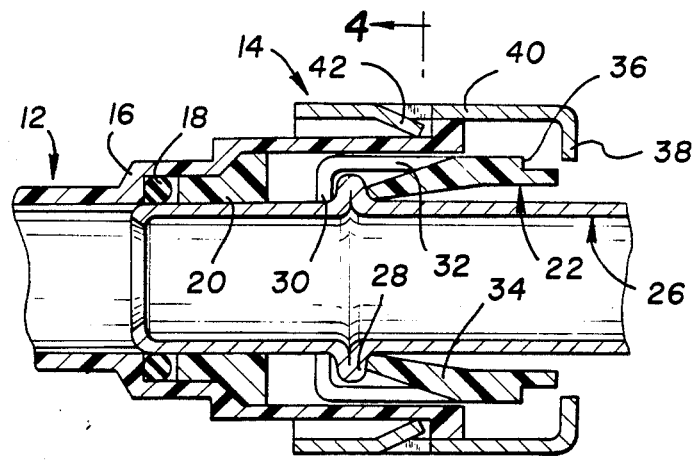
FIG. 3 is another cross sectional view of the connector assembly in FIG. 1, in which the cap has been rotated sufficiently to permit the conduit to be withdrawn to the bleed-down position.

As best seen from FIG. 1, the housing body 16 is formed to provide a pair of ramps generally designated by the reference numeral 44. While only one of the ramps 44 is visible from FIG. 1, both ramps are shown in the alternative embodiment of FIG. 5 to be discussed below. The ramps 44 provide an area of varying axial length along the exterior surface of the housing body 16. As will be appreciated from FIGS. 1-3, the ramps 44 permit the cap member 14 to slide axially along the exterior surface of the housing body 16 as the cap is rotated in a clockwise direction from the fully inserted position. As the cap is rotated in the clockwise direction, the cap 14 will be permitted to slide to the right as shown in FIGS. 1-3, thereby permitting the conduit 26 to be partially withdrawn from the housing 16. When the conduit 26 is withdrawn to the point where the vertically extending wall portion 36 of the retainer 22 engages the flange 38 of the cap member 14 shown in FIG. 3, the conduit 26 will come out of sealing engagement with the elastomeric O-ring 18. This will interrupt or break the fluid tight seal between the confronting portions of the housing 16 and the conduit 26, and permit the venting or release of pressure within the conduit 26. It should be noted that when the conduit 26 is in this bleed-down position, all of the components to the connector assembly 10 are still locked together. Accordingly, if it is desired to re-seal the connector assembly 10, all that is required is for the operator to reinsert the conduit 26 by hand into the fully inserted or sealed position shown in FIG. 2. If, on the other hand, it is desired to completely withdraw the conduit 26 from the housing body 16, it may be necessary to use an appropriate tool to permit the withdrawal of the annular projection 28 of the conduit 26 past the tabs 34 of the retainer 22. One example of such a tool is shown in FIG. 17 of the inventor's prior U.S. Pat. No. 4,541,658. While the housing body 16 is formed with the ramps 44 and the cap member is formed with the tabs 42, it should be appreciated that it may be possible to provide the ramps on the cap member and the tabs on the housing in the appropriate application.

As shown in FIG. 1, the ramps 44 may be provided with a variety of suitable shapes. Thus, for example, in FIG. 1 the ramps 44 are provided with a number of points 46 which create arched channels or detents large enough to catch and retain the tabs 42 of the cap member 14. These arched channels operate to prevent an inadvertent rotation of the cap member 14 with respect to the housing body 16 by requiring an axial insertion movement of the cap member 14 prior to rotation.

While the ramps 44 need only provide axial movement between the fully inserted and bleed-down positions of the conduit 26, one or more intermediate positions may be provided, as shown in FIG. 1. Additionally, it should be appreciated that the slope of the ramps 44 may be varied to permit a controlled withdrawal of the conduit 26, and hence a controlled venting of the pressure in the conduit. Accordingly, while an approximately 45° slope is shown in FIG. 1 for the ramps 44, other suitable slopes below this value and up to and including 90° may be provided in the appropriate application. Additionally, it should be noted that the ramps 44 may be constructed by either providing a raised portion to the exterior surface of the housing body 16, or by providing suitable channels formed in the exterior surface of the housing body. The height of such a raised portion or the depth of such a channel portion need only be such as to capture or trap the tabs 42 such that they will engage the generally vertically extending surface of the ramps 44.

In the embodiment shown in FIGS. 1 through 3, the housing 16 is made out of injection molded plastic, while the cap 14 is made out of metal. However, as shown in the housing body 48 of the embodiment of FIG. 5, the housing body may also be constructed of metal. These metal components may be die cast, stamped or deep drawn in the appropriate applications.

Figure 5:
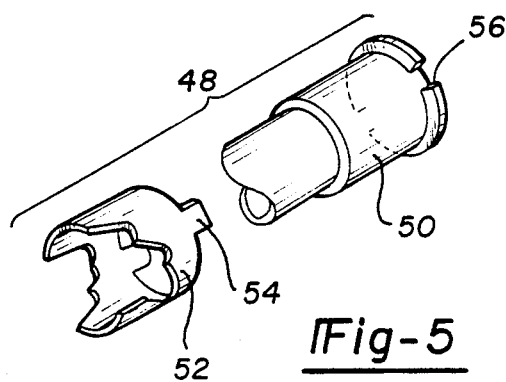
FIG. 5 is a perspective assembly view of another embodiment of a connector housing according to the present invention.

As shown in FIG. 5, the housing body 48 comprises a main housing structure 50 and an annular ramp ring 52 which is closely fitted to slip to snap over the housing structure 50 (via a split ring construction for the ramp ring). The ring 52 includes a pair of diametrically opposed axially extending tangs 54 which are adapted to be nestingly received in a pair of notches 56 formed in the housing structure 50.

Figure 6:
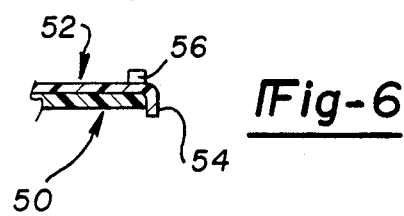
FIG. 6 is a fractional cross sectional view of the housing assembly shown in FIG. 5.

As shown in FIG. 6, the tangs 54 are then folded inwardly over the end of the housing structure 50 to prevent the rotation of the ramp ring 52 with respect to the housing structure 50.

Figure 7:
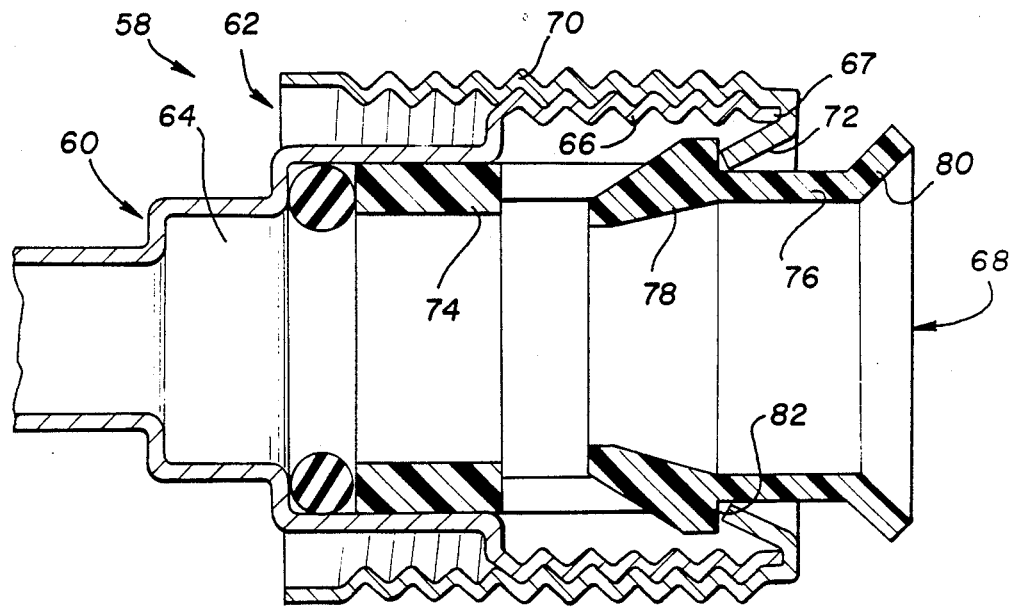
FIG. 7 is a cross sectional view of another embodiment of a bleed-down connector assembly according to the present invention.

Referring to FIG. 7, another embodiment of a bleed-down connector assembly 58 according to the present invention comprises a stepped cylindrical housing sub-assembly 60 and a cap member 62, the assembly 58 defining a receptacle 64 adapted to receive a male conduit element (not shown) such as that shown by conduit 26. Housing sub-assembly 60 comprises a forward end portion 66 that terminates in forward end 67 and receives a retainer element 68 and a seal element such as that shown by elastomeric O-ring 18.

Cap member 62 includes a generally cylindrical body portion 70 that is sized to be interfitted about forward end portion 66 of the housing subassembly and terminates in a wall portion 72 that extends radially inwardly of the receptacle and 360° therearound to form a U-shaped channel for seating against forward end 67 and limiting inward axial insertion of cap 62 relative to housing subassembly 60. Preferably, cylindrical portions 66 and 70 are of metal and formed with matable helical ridges or grooves which define a threadlike area that allows the cap to be screwed onto subassembly 60 and thereby be axially secured at any desired position relative thereto.

Retainer element 68, in the embodiment shown, is integrally formed of plastic and comprises spaced body portions 74 and 76 a plurality of generally axially extending leg portions 78 and release tabs 80. Retainer element portions 74 and 78 define between respective confronting vertical faces an annular space to receive the outwardly projecting annular surface 28 of the conduit 26 to fix the conduit relative to the retainer when inserted therein. An axially outward facing vertical wall 82 of leg portion 78 is adapted to engage inturned wall portion 72 to fix the axial position of the retainer element 22 relative to the receptacle. Leg portions 78 and release tabs 80 are resilient and can be deflected to permit removal of retainer element 66 from the receptacle.

Figure 8:
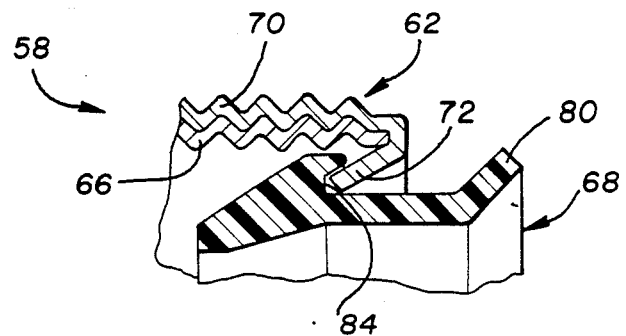
FIG. 8 is a partial cross sectional view of a portion of yet another bleed-down connector assembly according to the present invention.

FIG. 8 shows a portion of cylindrical body portions 66 and 70, respectively, of housing subassembly 58 and cap 62. Retainer element 68 is formed with a channel-shaped wall portion 84 into which will nest wall portion 72 of cap 62 and in a manner that resists any disengaging squeeze applied to release tabs 80 when the system is pressurized. The pressure in the system operates on the male conduit element (not shown in this FIGURE) forcing retainer element 66 in a direction axially outward of the receptacle and back into abutting relation against the wall portion 72 so that the U-shaped channel area formed by wall portion 84 is "engaged" thereby resisting the decoupling motion and forces applied to releasing tabs 80.

The various embodiments which have been set forth above were for the purpose of illustration and were not intended to limit the invention. It will be appreciated by those skilled in the art that various changes and modifications may be made to these embodiments described in this specification without departing from the spirit and scope of the invention as defined by the appended claims.

I claim:

1. A connector assembly for providing a bleed-down connector position with a tubular conduit which is adapted to convey a pressurized fluid, comprising:
   housing means for receiving said conduit, said housing means including a ramp means for enabling axial positioning of a cap means, said ramp means being circumferentially positioned about said housing and including varying axial lengths;
   sealing means for providing a fluid tight connection between confronting portions of said housing means and said conduit when said conduit is in a fully inserted position in said housing means;
   retainer means for maintaining said conduit in said housing means; and
   said cap means rotatably mounted on said housing means for controlling the axial position of said retainer means in cooperation with ramp means, catch means associated with said cap means for engaging said ramp means and limiting the axial movement of said cap means with respect to said housing means, said cap means is capable of sliding axially with respect to said housing means upon the rotation of said cap means such that said conduit is permitted to be partially withdrawn from said housing means with the rotation of cap means to said bleed-down connector position in which said sealing means fluid tight connection is interrupted and means for locking said cap means to said housing means to prevent disengagement of said cap means from said housing means.

2. The connector assembly according to claim 1, wherein said cap means is locked to said housing means to prevent the disengagement of said cap means from said housing means.

3. The connector assembly according to claim 2, wherein said ramped axial position varying means includes ramp means associated with the exterior of said housing for permitting said cap to slide axially with respect to said housing means upon the rotation of said cap means, and depending catch means associated with the interior of said cap means for engaging said ramp means and limiting the axial movement of said cap means with respect to said housing means.

4. The connector assembly according to claim 3, wherein said ramped axial position varying means includes detent means formed on said ramp means for nestingly receiving said catch means in said fully inserted position.

5. The connector assembly according to claim 4, wherein said ramped axial position varying means further includes a plurality of detent means formed on said ramp means.

6. The connector assembly according to claim 3, wherein said catch means includes a plurality of circumferentially spaced tabs formed in said cap means, said tabs being directed radially toward said housing means at an acute angle such that the free end of each of said tabs faces said ramp means.

7. The connector assembly according to claim 3, wherein said ramp means comprises a ring which is concentrically disposed over and secured to said housing means, said ring being formed with said varying axial length in the general form of a pair of circumferentially spaced ramps.

8. The connector assembly according to claim 7, wherein said ring includes at least one tang which is nestingly received and locked around a notch formed in said housing means.

9. The connector assembly according to claim 1, wherein said cap means includes a wall portion at one end which is formed to engage said retainer means and limit the axial movement of said retainer means associated with the withdrawal of said conduit from said housing.

10. The connector assembly according to claim 9, wherein said cap means wall portion has generally the shape of an inwardly directed flange at one end of said cap means.

11. In a connector assembly which provides a sealed position with a conduit adapted to convey a pressurized fluid and a bleed-down position, a cap which is mounted for both rotational and axial sliding movement with respect to a connector housing portion which nestingly receives said conduit, the axial position of said cap defining said sealed and bleed-down positions of said connector assembly and means for locking said cap to the connector housing to prevent disengagement of said cap from the housing.

12. The connector assembly according to claim 11, wherein said cap includes a wall portion which is formed to engage a means associated with said connector assembly for retaining said conduit in said housing.

13. The connector assembly according to claim 12, wherein said cap means includes catch means for limiting the axial movement of said cap means with respect to said housing.

* * * * *

UNITED STATES PATENT AND TRADEMARK OFFICE
CERTIFICATE OF CORRECTION

PATENT NO. : 4,944,536

DATED : July 31, 1990

INVENTOR(S) : Donald D. Bartholomew

It is certified that error appears in the above-identified patent and that said Letters Patent is hereby corrected as shown below:

On the title page:
Abstract, Line 1, "blood-down" should be --bleed-down--;

Abstract, Line 1, "conector" should be --connector--;

Abstract, Line 2, "rotatatable" should be --rotatable--;

Abstract, Line 3, "conducit" should be --conduit--;

Col. 2, Line 42, after "assembly", insert --shown--;

Col. 3, Line 6, after "in", insert --the housing--;

Col. 3, Line 19, after "of", insert --the retainer--;

Col. 3, Line 26, after "elements", insert --are--.

Signed and Sealed this

Seventh Day of January, 1992

Attest:

HARRY F. MANBECK, JR.

*Attesting Officer*     *Commissioner of Patents and Trademarks*